(No Model.)
E. DAWSON.
TROLLEY FOR ELECTRIC RAILROADS.
No. 525,886. Patented Sept. 11, 1894.
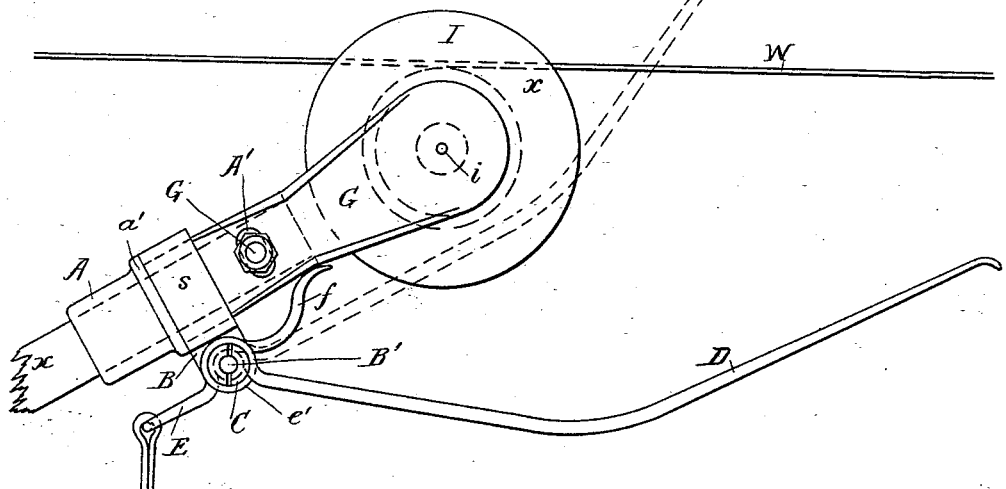
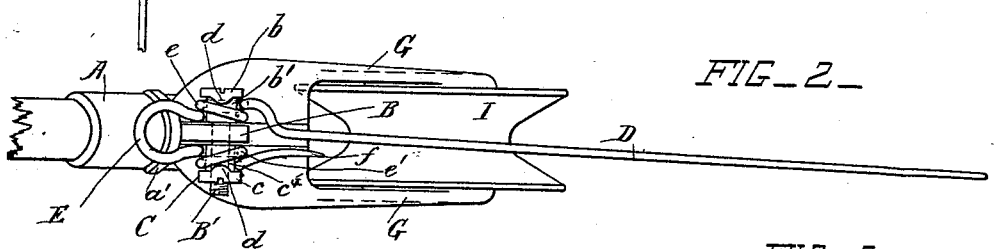
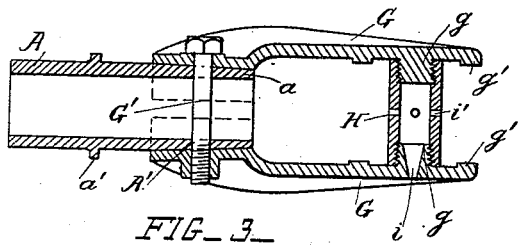
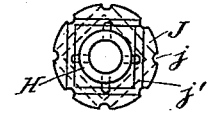
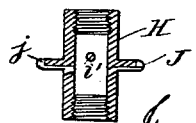
Witnesses:
George H. Bliss.
Frank G. Grimes.
Inventor.
Edward Dawson
by Herbert W. Turner
Attorney.
THE NORRIS PETERS CO., PHOTO-LITHO., WASHINGTON, D. C.

UNITED STATES PATENT OFFICE.

EDWARD DAWSON, OF TERRE HAUTE, INDIANA.

TROLLEY FOR ELECTRIC RAILROADS.

SPECIFICATION forming part of Letters Patent No. 525,886, dated September 11, 1894.

Application filed December 26, 1893. Serial No. 494,720. (No model.)

*To all whom it may concern:*

Be it known that I, EDWARD DAWSON, a citizen of the United States, residing at Terre Haute, in the county of Vigo and State of Indiana, have invented certain new and useful Improvements in Trolleys for Electric Railroads; and I do hereby declare the following to be a full, clear, and exact description of the invention, such as will enable others skilled in the art to which it appertains to make and use the same.

This invention relates to trolleys for electric railroads; and it consists in the novel construction and combination of the parts hereinafter fully described and claimed.

In the drawings Figure 1 is a side view of the trolley head. Fig. 2 is a plan view of the same, from below. Fig. 3 is a longitudinal section of the trolley head, taken on the line $x\ x$ in Fig. 1. Fig. 4 is a side view, and Fig. 5 is a longitudinal section, of the modification of the hollow pin upon which the trolley wheel runs.

A is a socket adapted to be secured to the top of an ordinary trolley pole. This socket is provided with a conical end $a$, a bead $a'$, and circumferentially elongated holes $A'$ in its end $a$. A lug B projects from the under side of the socket A for the attachment of the wire finder. The lug may be formed integral with the socket or on a collar $s$.

$B'$ is a pin which is journaled in a hole in the lug B, and is provided with the head $b$ and the collar $b'$.

C is a nut screwed on the end of the pin $B'$ and provided with the head $c$ and the collar $c'$. A projection $d$ is formed on each of the collars $b'$ and $c'$, close to the heads.

The wire finder consists of a curved rod D. This rod is bent to any approved form or curvature. A portion of the rod is bent around to conform to the collar $b'$, forming a coil $e$; and another portion of the said rod is bent around to conform to the collar $c'$, forming a coil $e'$. The portion of the rod between the two said coils is bent into a loop E for the attachment of the lifting cord $E'$. The end of the rod beyond the coil $e'$ is bent upward and forms a spring $f$. The projections $d$ of the collars engage with the ends of the coils $e$ and $e'$ and lock the coils to the collars, at the same time locking the nut upon the bolt.

The trolley wheel carrier consists of two brackets G. The lower ends of these brackets conform to the shape of the end $a$ of the socket.

$G'$ is a bolt for securing the brackets to the socket. This bolt passes through the holes $A'$ which permit the brackets to be adjusted circumferentially of the socket, so that the trolley wheel may be set to run in a true vertical plane. The spring $f$ bears against one of the brackets G, and normally holds the wire finder depressed and clear of the line wire or conductor W, as shown in full lines in Fig. 1. The brackets G are provided with screwthreaded bosses $g$ arranged in line with each other, and cheeks $g'$.

H is a hollow pin, and I is an ordinary trolley wheel journaled on the pin H. The ends of the pin H are screwed upon the bosses $g$, and the hub of the trolley wheel runs between the cheeks $g'$. The hollow pin H forms a reservoir for lubricating material. A hole $i$ is provided in one of the brackets for inserting the oil or other lubricant. The pin is preferably filled with cotton waste or other absorbent material, and the oil finds its way to the bearing of the trolley wheel pin through holes $i'$ in the periphery of the pin.

When a wheel is used like that shown in the Patent No. 487,257, issued to me on December 6, 1892, a disk J is formed upon the hollow pin, and this disk is provided with notches $j$ on its periphery, and grooves $j'$ in its sides, as shown in Fig. 4 and 5, for the purpose of distributing the lubricant.

When the trolley is changed from one end of the car to the other, the cord $E'$, being pulled, moves the wire finder into the position indicated by the dotted lines in Fig. 1, and the rod guides the trolley wheel onto the wire by projecting upwardly above the wheel and engaging with the groove in the wheel. When the lug B is formed on a collar $s$ as shown, the collar is free to revolve and the trolley pole can be moved in a vertical plane from one end of the car to the other.

What I claim is—

1. The combination, with a socket adapted to be secured to a trolley pole and provided with a conical upper end, and circumferentially elongated holes in its said end; of the two brackets for carrying the trolley wheel, and a bolt pass through the said brackets and holes and permitting the brackets to be adjusted, substantially as set forth.

2. The combination, with a socket adapted to be secured to a trolley pole, of two brackets secured to the said socket and provided with screwthreaded bosses at their upper ends, and a hollow pin screwed upon the said bosses and forming the bearing for the trolley wheel, substantially as set forth.

3. The combination, with a trolley head provided with a lug on its under side, and a pin passing through the said lug; of a wire finder consisting of a rod provided with coils $e$ and $e'$ encircling the ends of the said pin, a loop between the said coils for the attachment of the trolley operating cord, and a spring end normally holding the other end of the said rod clear of the line wire, substantially as set forth.

4. The combination, with a trolley head provided with a lug on its under side, of a pin journaled in the said lug and provided with a collar $b'$ and a projection $d$, a nut screwed on the end of the said pin and provided with the collar $c'$ and a projection $d$; and a wire finder consisting of a rod provided with coils engaging with the said collars and projections, and a loop between the said coils for the attachment of the trolley operating cord, substantially as set forth.

In testimony whereof I affix my signature in presence of two witnesses.

EDWARD DAWSON.

Witnesses:
WM. WURTZEBACH,
GEO. R. GRIMES.